3,210,256
MANUFACTURE OF NUCLEAR REACTOR FUEL ELEMENTS
Thomas John Heal, Appleton, near Warrington, and Ian Hugh Morrison, Ashton, Preston, England, assignors to United Kingdom Atomic Energy Authority, London, England
No Drawing. Filed Dec. 6, 1961, Ser. No. 157,542
Claims priority, application Great Britain, Dec. 8, 1960, 42,230/60
4 Claims. (Cl. 176—81)

This invention relates to nuclear reactors and in particular to that kind of nuclear reactor fuel elements which comprises a fuel member of uranium metal or uranium base alloy enclosed in a sheath of magnesium base alloy intended to protect the fuel member against oxidation and to retain fission products produced on irradiation of the fuel.

To prevent relative movement between the fuel member and its sheath occuring on thermal cycling during operation, it is known to equip the fuel member with a plurality of circumferential grooves and as a step in the manufacture of the fuel element to heat the assembly of the fuel member and sheath and to apply pressure to the sheath to cause it to deform into the grooves and thereby key the sheath to the fuel member. Pressure can either be applied by gaseous or hydraulic means. However, an important factor in fuel element performance is grain size and stability thereof and in the manufacture of the sheath it is considered most desirable to subject the sheath inter alia to cold working to assist in ensuring fine grain size. For example, in the case of fine-pitch helically finned sheaths, the fins may be produced by fin-rolling a thick-walled tubular body of the sheath material with employment of a mandrel, and such fin-rolling subjects the sheath material to cold working. In the case of coarse-pitch helically finned sheaths, production may be by impact extrusion, which provides longitudinal fins, followed by twisting to transform the fins to helical form. The twisting step subjects the sheath material to cold working. It is important during the pressurising step not to lose the value of this cold working by subjection to excessive temperature which would encourage uncontrolled grain growth. At the comparatively low temperatures (around 250° C.) necessary for preventing grain growth, the pressure needing to be employed to produce the desired bonding requires to be large (of the order of 12,000 lbs./sq. inch) to offset the effect of the higher strength at these lower temperatures. This means that in practice hydraulic pressurising is preferred to gas pressurising, because of the danger involved in the use of gas at these pressures.

According to the invention, in the manufacture of a nuclear reactor fuel element, intended for use in the low temperature regions of a nuclear reactor, from a fuel member of uranium or uranium base alloy and a magnesium base alloy sheath which has inter alia been cold worked to assist in ensuring fine grain size, the manufacture includes the steps of pressurising the sheath, at a temperature such that uncontrolled grain growth of the material of the sheath does not occur, into grooves in the fuel member for preventing relative longitudinal movement between the fuel member and the sheath, allowing the assembly to cool, and annealing the assembly at a temperature substantially above the temperature range of 140–350° C. at which the fuel element is intended to operate so as to effect recrystallisation of the material of the sheath to a fine grain structure, whereby the sheath of the fuel element is provided with sufficient ductility to discourage cavitation failures in the operating temperature range 140–350° C., there being little tendency to grain growth within that temperature range.

It will be appreciated that the method according to the invention is intended to prolong the useful life of a fuel element under irradiation in a nuclear reactor.

The invention also envisages a gas-cooled graphite moderated nuclear reactor having in fuel element channels in its cooler regions, where the operating temperature is in the range 140–350° C., fuel elements whose manufacture includes the steps hereinbefore set forth.

It will be appreciated that the temperature range quoted corresponds to conditions which occur during normal operation in the cooler regions of the core of a nuclear reactor, for example a nuclear reactor of the British civil power generating type such as Bradwell, Berkeley, etc.

A typical example of the application of the method according to the invention to the manufacture of a nuclear reactor fuel element will now be described. The fuel member consists of a uranium rod produced by vacuum casting, having had Fe and Al additions (see our British patent specification No. 863,492) made to it prior to casting, and having undergone after casting a heat treatment comprising heating to 750° C., quenching with water, annealing in argon at 550° C. for one hour followed by cooling to room temperature (see our British patent specifications Nos. 812,123 and 806,971). The fuel member has circumferential grooves of about .02″ depth machined in it and is subsequently enclosed within a protective sheath of the magnesium base alloy formerly known as Magnox A12 and now known as Magnox AL80 (0.8% Al, .01% Be, remainder Mg), the sheath having inter alia been cold worked in the course of its formation to assist in ensuring fine grain size of the material thereof. The assembly of fuel rod and sheath is subjected to oil pressurising, for example employing equipment described on page 106 of "Nuclear Power," vol. 4, No. 35 (March 1959), by preheating in oil at 250° C. and 100 lbs./sq. inch pressure for 15 minutes, the pressure then bring raised to 12,000 lbs./sq. inch and maintained for 30 minutes so as to pressurise the material of the sheath into the grooves in the fuel member and thereby key the sheath and fuel member together. The pressure is then released and the assembly is removed from the oil to cool in air. The temperature at which pressurising is carried out is insufficient to destroy or greatly impair the effect of the cold working performed on the sheath during its manufacture.

After cooling, the assembly is subjected to a temperature anneal by being supported vertically in a furnace in an atmosphere of air at atmospheric pressure and at 380–390° C. for 30 minutes, followed by cooling in air to room temperature. The anneal effects recrystallisation to a fine grain structure of the material of the sheath, and it also serves the remove local strain concentrations resulting from the pressurising step.

A fuel element subjected to the foregoing steps is intended to operate in a cool region of a gas-cooled graphite moderated nuclear reactor where the sheath temperature is in the range 140–350° C. At these temperatures there is little tendency to grain growth and moreover the ductility arising from the fine grain size is sufficient to withstand the strains arising from growth or deformation of the fuel member. Cavitation failures of the sheath are thereby discouraged.

Fuel elements produced by the said method are clearly marked to ensure that they are not confused with fuel elements intended for the hotter regions of the reactor.

The following are comparative results of measurements of grain size of complete sheaths after production of fuel elements by the described method (designated "A") and by another method (designated "B").

| Grain size measurement in the "as produced" condition | "A" Hydraulic Press'n and Anneal. at 390° C. | | "B" Gas Press'n for 8 hrs. at 515° C. | |
|---|---|---|---|---|
| No. of sheaths examined (A and B) | Grain size, units of 0.001" | | Grain size, units of 0.001" | |
| | Average | Maximum | Average | Maximum |
| A=12, B=6 | 6 | 21 | 36 | 276 |

Experience indicates that a reasonable standard for grain size to minimize cavitation failure is 0.007" average, 0.020" maximum. The results show that fuel elements treated according to the described method (method "A") are better equipped, by virtue of the grain size of their sheaths approximating much more closely to the said standard than that of the sheaths of fuel elements produced by method "B," for service in the cooler regions, as herein defined, of a nuclear reactor.

The term "uranium base alloy" where employed herein is intended to cover known alloys of uranium with small quantities, up to a total of 10%, of alloying ingredients such as iron, aluminum, niobium, titanium, zirconium, molybdenum and chromium, which improve the resistance of the alloy to growth or deformation under neutron irradiation without undue penalty of high neutron capture cross-section.

We claim:

1. In the process of manufacture of a nuclear reactor fuel element, intended for use in the low temperature regions of 140–350° C. in a nuclear reactor, from a fuel member of the group consisting of uranium and uranium base alloy, and a magnesium base alloy sheath of fine grain size, the steps of pressurising the sheath, at a temperature such that uncontrolled grain growth of the material of the sheath does not occur, into keying contact with the fuel member for preventing relative longitudinal movement between the fuel member and the sheath, allowing the assembly to cool, and annealing the assembly at a temperature up to 390° C. substantially above the temperature range of 140–350° C. at which the fuel element is intended to operate so as to effect recrystallisation of the material of the sheath to a fine grain structure whereby the sheath of the fuel element is provided with sufficient ductility to discourage cavitation failures on subjecting the fuel elements to prolonged straining in the operating temperature range 140–350° C., there being little tendency to grain growth within that temperature range.

2. A process, according to claim 1, for manufacture of a nuclear reactor fuel element intended to operate in the temperature range 140–350° C., wherein pressurising is effected at a temperature in the region of 250° C. and subsequent annealing is effected at about 380–390° C.

3. A process according to claim 1, wherein the magnesium alloy sheath is subjected to cold working during production and is thus provided with a fine grain structure.

4. A nuclear reactor fuel element intended for use in the low temperature range of 140–350° C. in a nuclear reactor and comprising a fuel member of the group consistting of uranium and uranium base alloy, and having a magnesium base alloy sheath of fine grain size, wherein the manufacture of said fuel element includes the process steps set forth in claim 1.

References Cited by the Examiner

UNITED STATES PATENTS 2,820,751   1/58   Saller.

FOREIGN PATENTS 553,970   4/57   Belgium.
875,832   8/61   Great Britain.
875,466   8/61   Great Britain.

JOHN F. CAMPBELL, *Primary Examiner.*

OSCAR R. VERTIZ, *Examiner.*